(No Model.)
A. LAWRENCE.
METHOD OF MAKING TUBES.
No. 445,854. Patented Feb. 3, 1891.
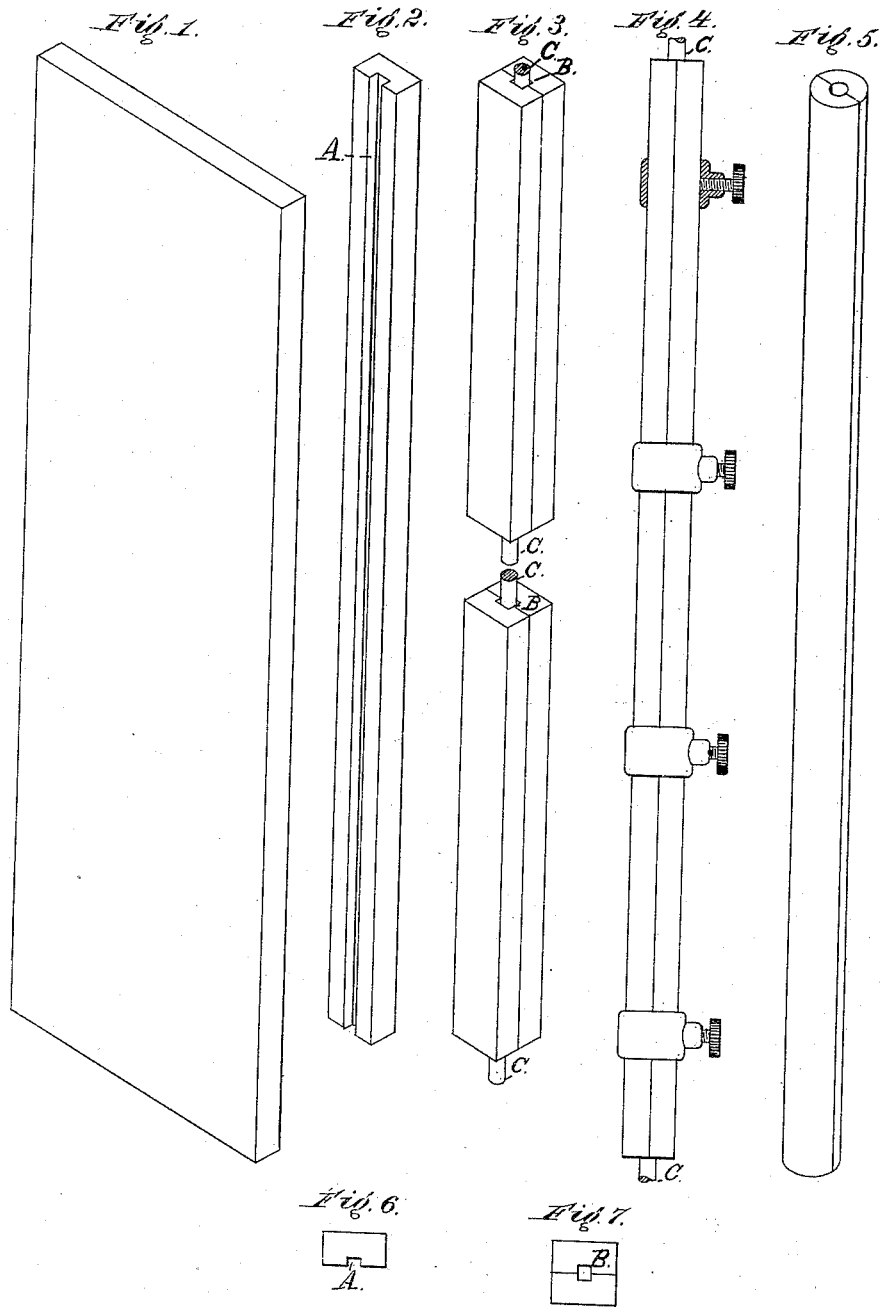
Witnesses
Kirkley Hyde.
Nathaniel Hill.
Inventor
Alvin Lawrence.

UNITED STATES PATENT OFFICE.

ALVIN LAWRENCE, OF LOWELL, MASSACHUSETTS.

METHOD OF MAKING TUBES.

SPECIFICATION forming part of Letters Patent No. 445,854, dated February 3, 1891.

Application filed June 11, 1890. Serial No. 355,044. (No model.)

*To all whom it may concern:*

Be it known that I, ALVIN LAWRENCE, a citizen of the United States, residing at Lowell, in the county of Middlesex, in the State of Massachusetts, have invented a certain Improved Method of Forming Compensation-Tubes for Clock-Pendulums; and I do hereby declare that the following is a full, clear, and exact description of the invention, which will enable others skilled in the art to which it appertains to make and use the same.

My invention relates to the method of forming compensation-tubes, such as is shown in the compensation - pendulum known as "Reid's," and also shown in my patent of January 15, 1889. These tubes have heretofore been described as made of cast and hammered zinc. Such tubes, aside from the difficulties of producing them in perfect form, are subject to uneven tension of their particles, and the consequent effect is to produce erratic variations in the length of the tube from occasional molecular adjustment of the particles of zinc, thus causing variations of the rate of the pendulum.

The object of my invention is to produce a compensation-tube more free from the objectionable erratic changes above noted, and also to facilitate the operations in construction. I attain this object by the means illustrated in the accompanying drawings, in which—

Figure 1 represents a plate of rolled zinc about five-sixteenths of an inch thick and of the length desired for the completed tube, the grain running in the direction of the length. Fig. 2 represents a strip about five-eighths of an inch wide cut from the plate of rolled zinc by metal saw or planer, and provided with a groove planed or milled along the center of one side about one-eighth of an inch wide and about one-half as deep. Fig. 3 represents two strips, such as are shown in Fig. 2, placed together, the grooves A, Fig. 2, together forming a central hole B, Fig. 3, through the entire length. C, Figs. 3 and 4, represents a core temporarily laid in the united grooves B. The middle portions of the strips and core are broken away in the drawings. Fig 4 represents the strips and core, as in Fig. 3, with clamps temporarily placed on the strips to hold them in position. Fig. 5 represents the completed tube. Fig. 6 is a cross-section of Fig. 2. Fig. 7 is a cross-section of Fig. 3.

After the strips are clamped, as shown in Fig. 4, I solder the strips together by flowing the solder into the seam between the strips. The core, which is preferably of cotton-covered wire or seamless metal tube, prevents the solder entering the hole B. After the soldering is completed I remove the core and then bore out hole B to the size desired to fit freely over the center rod of the pendulum. The outside of the bar formed of the two strips is then turned concentric with the central hole.

By the use of moderately-thin plates of zinc I get metal of great uniformity of texture, and by grooving the two strips, thus forming a leading hole through the united strips, I am able to bore through the bar with great precision as to straightness, and perfectly central, avoiding the necessity of using strips or bars greatly in excess of the dimensions required in the finished tube. The finished tubes thus formed have been proven to be very uniform in regard to expansion and free from erratic changes, while the method of forming the tube of strip provided with straight grooves, as described, renders certain the operation of making the finished tubes, which under former methods has been a matter of great difficulty and uncertainty.

What I claim as my invention, and desire to secure by Letters Patent, is—

1. The method of making compensation-tubes for clock-pendulums, which consists in forming straight grooves in strips of rolled zinc or other suitable metal, clamping such strips together in pairs with the grooves adjacent to each other, and then applying solder to firmly unite the strips together.

2. The method of making compensation-tubes for clock-pendulums, consisting in taking a rolled sheet of zinc, cutting the same into strips of suitable length and width, forming a straight groove in each strip, clamping the strips together in pairs with the grooved surfaces abutting, thus forming a square tube, placing a suitable mandrel therein, soldering the abutting edges of the strips together, and then finishing the tube to the desired form.

ALVIN LAWRENCE.

Witnesses:
   NATHANIEL HILL,
   ABBOTT LAWRENCE.